Nov. 10, 1970  C. H. GEBO  3,539,792
SQUARE ROOT EXTRACTING SYSTEMS FOR INDICATING, RECORDING,
INTEGRATING, CONTROLLING AND THE LIKE
Filed June 28, 1967

3,539,792
SQUARE ROOT EXTRACTING SYSTEMS FOR INDICATING, RECORDING, INTEGRATING, CONTROLLING AND THE LIKE
Charles H. Gebo, Chili, N.Y., assignor to Taylor Instrument Companies, Rochester, N.Y., a corporation of New York
Filed June 28, 1967, Ser. No. 649,547
Int. Cl. G06g 7/20
U.S. Cl. 235—193.5
11 Claims

ABSTRACT OF THE DISCLOSURE

An amplifier system including a carrier wave amplifier has a phase sensitive, full wave, voltage doubling, transistor demodulator, and a function generator feedback loop causing the demodulator output voltage to be a square root function of amplifier input signal. The function generator includes a diode circuit that makes the demodulator output signal substantially zero for input signal in a neighborhood including zero input signal. A device measuring pressure drop in a flowing fluid produces the input signal as a straight line function of pressure drop. The demodulator output signal is used for indicating, recording, integrating, controlling and/or like purposes. Suitable output circuitry provides for simultaneous use for these purposes and for varying the relation between input signal range and output signal range.

Figure 1:
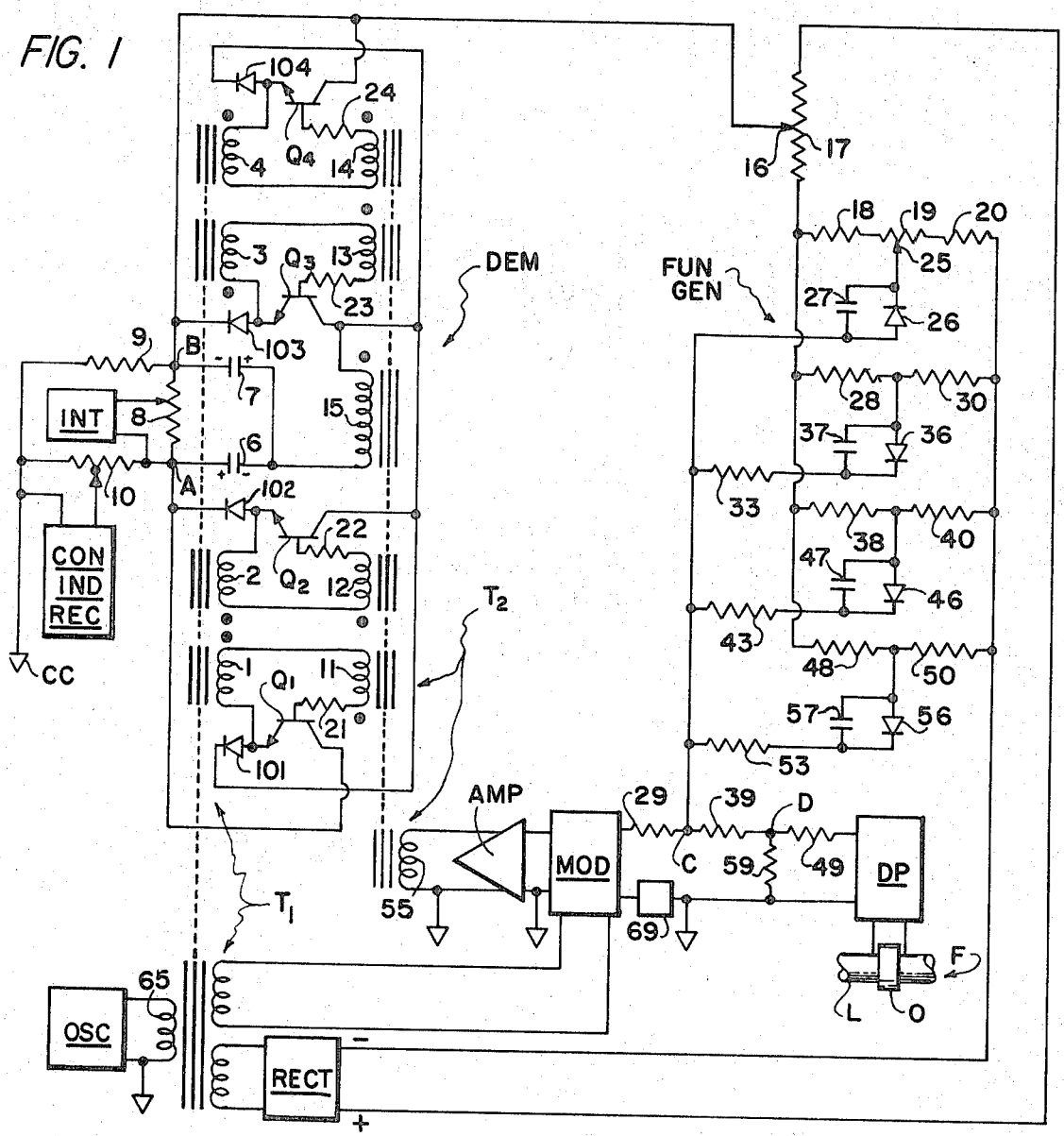
Figure 2:
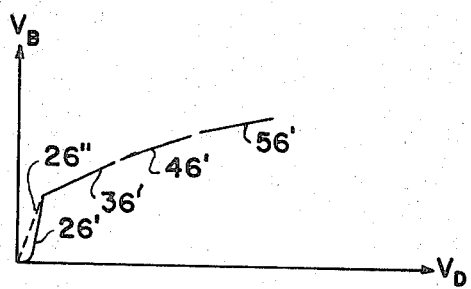
Figure 3:
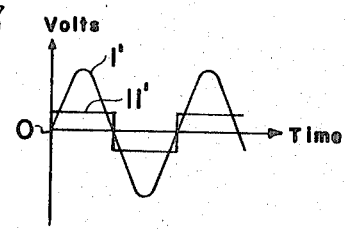

In the drawing, FIG. 1 is a schematic diagram of a square root extracting system according to the invention, and FIGS. 2 and 3 are diagrams illustrating certain principles of the invention.

This invention relates to square root extracting systems. While such systems have various uses, the present invention has particular utility in indicating, recording, integrating and controlling rate of fluid flow, wherein the indicating, etc., is based on a fluid parameter varying as the square of the flow rate. Thus, the fluid flows through an orifice or other restriction, the pressure drop across the restriction is measured by a suitable instrument which emits a first signal whose magnitude represents the magnitude of the pressure drop. The first signal is applied to a square root extracting system, which in turn produces a second signal whose magnitude is proportional to the square root of the magnitude of the first signal. The second signal is then taken as a measure of the rate of flow through hte restriction.

As is known, the peculiarities of the square root function create system difficulties at flows in the neighborhood of zero flow rate. It is difficult to assume that the instrument measuring the pressure drop emits zero magnitude first signal when flow rate is zero. At zero flow, the curve of pressure drop versus flow rate is tangent to the flow rate axis, making it difficult to establish a stable, accurate relation between first signal and second signal, in the neighborhood of zero flow.

According to the present invention, at some point in the system, the first signal is represented by a modulated carrier wave. The pressure drop information in the carrier wave is extracted by a phase sensitive, full wave, voltage doubling demodulator. Further, according to the invention, the square root extraction is performed by a feedback amplifier, where the input to the amplifier is the first signal, and its output is fed back to its input via a function generator which has the property of causing the output to remain fixed at substantially zero magnitude as long as the flow rate is in the above-mentioned neighborhood of zero.

In FIG. 1, the labels DEM, FUN GEN, MOD, AMP, RECT, OSC, DP, L, O and F, respectively, identify a demodulator, function generator, modulator, amplifier, rectifier, oscillator, differential pressure transmitter, a fluid-conducting line or pipe, orifice and direction of flow of fluid. Fluid flows through the line, the orifice creating a pressure drop in the line, which is converted to an electrical signal which is applied to the modulator in the form of a D.C. voltage whose magnitude is directly proportional to the magnitude of the pressure drop. The oscillator generates an A.C. carrier wave which is coupled to the modulator via a transformer $T_1$. The modulator combines the carrier wave and the D.C. voltage to produce an output wave whose amplitude is directly proportional to the magnitude of the D.C. voltage and which has a phase characteristic depending on the sense of the D.C. voltage.

The amplifier amplifies the modulator output wave, thereby producing a proportional output wave coupled by a transformer $T_2$ to the demodulator. The demodulator extracts the sense and magnitude information from the latter wave, producing a corresponding D.C. voltage which is fed back via the function generator to the modulator input, the arrangement being that whatever the sense of the input voltage due to the transmitter, the feedback voltage has the opposite sense. The gain from input to the modulator to output of the demodulator is made high enough that the net voltage applied to the modulator is kept at substantially zero. Closed loop gain depends on the extent to which the function generator feeds back demodulator output. For square root extracting purposes, the function generator is constructed so that, on the whole, the higher the demodulator output voltage attempts to go, the greater a fraction of the output voltage is fed back.

The demodulator has a full wave, phase sensing, voltage doubling action by virtue of the four transistors $Q_1$, $Q_2$, $Q_3$ and $Q_4$, and capacitors 6 and 7. As shown, the oscillator is coupled to the transistors by $T_1$ which, as indicated by the dashed-line-connected core symbols, has a core on which all the windings 1, 2, 3 and 4 are wound, as well as those coupling the modulator and the rectifier to the oscillator. The system is synchronous, that is, phase difference between modulator output and the oscillator voltage is substantially zero degrees or 180 degrees, and nothing else.

The amplifier couples to the demodulator by windings 11, 12, 13, 14 and 15. Of these windings, winding 15 is the source of the information to be extracted by demodulation. Windings 11 through 14 have an ancillary purpose, later to be described, and might be replaced by expedients other than transformer windings. Windings 11 through 15 are all windings on the core of transformer $T_2$.

Each of the nine demodulator windings has a dot indicating relative polarity. For example, if the dotted end of winding 15 is going positive with respect to its other end, the dotted end of each of windings 11 through 14 is also going positive with respect to its other end.

Likewise, as to the windings 1 through 4. However, the polarity of the dotted ends of the $T_2$ windings may be either like or unlike that of the dotted ends of the $T_1$ windings, and vice versa, depending on the polarity of the D.C. voltage applied to the modulator by the differential pressure transmitter. The former polarity would reverse if the direction of flow were reversed, or if the connections of the transmitter to the modulator were to be accidentally or purposely interchanged with one another.

Suppose that at some given instant the voltages across windings 1, 2, 3 and 4 begin to go positive at their dotted ends. This eventually turns $Q_1$, $Q_2$ on, since their bases now begin to go positive with respect to their emitters. That is, since the transistors are all NPN, eventually each of $Q_1$ and $Q_2$ will go from a very high collector to emitter resistance to a very low collector or to emitter resistance. If at this time the dotted end of winding 15 is also going positive, there will be a current flow from collector to emitter of $Q_2$. Transistors $Q_3$ and $Q_4$, which are now reverse-biased, will pass no current from winding 15. Hence, the current in winding 15 will flow through the resistance 8 from A to B, being returned to winding 15 via capacitor 7, and charge capacitor 6. According to the locations of the dots at the ends of windings 11 and 1, the voltage at winding 11, at this time, subtracts from the voltage across winding 1; hence, $Q_1$ does not turn on as soon as $Q_2$. This delay is proportioned to assure that $Q_1$ does not conduct until the voltage across winding 15 is higher than that across capacitor 6, thereby preventing capacitor 6 from discharging back through $Q_1$ and diode 101, to the dotted end of winding 15. Such discharge would decrease the efficiency of conversion of the A.C. voltage output of the amplifier to the D.C. output of the demodulator. Consequently, only $Q_2$ passes load current on this half cycle.

If, with windings 1, 2, 3 and 4 going positive at their dotted ends, the dotted end of winding 15 had been going negative instead of positive, winding 12 would have subtracted from the voltage across winding 2, whereas winding 11 would have added to the voltage across winding 1, and now $Q_1$ would have turned on before $Q_2$. A delay again stops the capacitor 6 from discharging back through the winding 15. Consequently, current flow through resistance 8 will reverse with reversal of the phase of the A.C. voltage across winding 15. The base voltages of $Q_3$ and $Q_4$ would remain negative. Hence, no conduction through them will occur. Consequently, only $Q_1$ passes load current.

Since the voltages of the two transformers differ in phase with respect to each other either by zero degrees or 180 degrees, the foregoing is a description of demodulator operation (as to $Q_1$ and $Q_2$) for the two possible cases of phase difference that can exist on one half of a cycle of oscillator voltage. In the in-phase case, load current flows from A to B and the D.C. input to the amplifier has a given polarity. In the out-of-phase case, load current flows from B to A, and the D.C. input has the reverse of the given polarity.

At the end of the aforesaid one half of a cycle, the dotted ends of the windings 1, 2, 3 and 4 start going negative in the other half of a cycle of oscillator voltage. Here again, the voltage across winding 15 is either out-of-phase or it is in-phase, with respect to the voltage across windings 1, 2, 3 and 4, and in either case, transistors $Q_1$ and $Q_2$ are now biased off, whereas $Q_3$ and $Q_4$ are coming into operation. Thus, if winding 15 is going positive at its dotted end, the voltages of windings 3 and 13 are adding, whereas the voltage of winding 14 subtracts from the voltage of winding 4. Consequently, $Q_3$ turns on first and current flows from B to A in the load resistance 8. On the other hand, if the dotted end of winding 15 is going negative, $Q_4$ turns on before $Q_3$, and load current flows from A to B through load resistance 8. In either case, there is a conduction delay which prevents back discharging the proper one of capacitors 6 and 7 through the corresponding one of one of transistors $Q_3$ and $Q_4$.

From the foregoing, it will be seen that in the in-phase case, one half of a cycle of amplifier output causes load current to flow from A to B by virtue of conduction via $Q_2$, whereas the other half cycle causes flow from A to B by virtue of conduction via $Q_4$. For the out-of-phase case, a full cycle of amplifier output causes current flow from B to A, by virtue of the consecutive conducting actions of $Q_1$ and $Q_3$.

The capacitors 6 and 7 provide voltage doubling since the potential at the connection between the two is always intermediate the potentials at A and B, whereas the voltage across each capacitor is always substantially that across winding 15. The capacitors 6 and 7 are, of course, non-polarized. The capacitors must also have relatively large capacities, because whenever load current flows, one or the other capacitor discharges to some degree to maintain load current.

Windings 1 through 4 can be eliminated, with the delays they provide being produced by shunting each of the base resistors 21 through 24 with a capacitor (one capacitor per resistor, making four capacitors in all). While this simplifies $T_1$ (it would then have four fewer windings, the windings 11 through 14 now being connected directly to the respective transistor emitters, rather than through windings of $T_1$), it also cuts down demodulator output, since when the voltage across winding 15 crosses zero, there ensues an interval of time during which no transistor conducts, but during which both capacitors 6 and 7 are discharging.

The load on the demodulator is the network of resistors 8, 9 and 10, which provide for connection to a controller, indicator or recorder (as indicated by the box marked CON IND REC), and as well, for an integrator (INT), essentially a counter having a motor that causes the counter to accumulate counts in proportion to the voltage across that portion of resistor 8 to which the integrator is connected. Where there is no integrator, the resistor 8 can be eliminated.

D.C. feedback is taken from point B to the slider 16 of a range adjusting resistor 17, which is connected in series with resistors 18, 19 and 20 with the rectifier supplied by a winding of $T_1$. Resistor 19 has a slider 25 to which a diode 26, bypassed by a capacitor 27, is connected by its cathode. Except for the resistor 19 and slider 20, and sense of diode connection, the just-described diode-resistor-capacitor group is repeated ad libitum, three repetitions only being shown for simplicity. Except for diode 26, the diode-resistor array is conventional, the arrangement being that diodes 36, 46 and 56 conduct, in that order, as the feedback voltage at slider 16 departs from the potential of circuit common, indicated by inverted triangles at various points (for example, at CC). For explanation purposes, point B may be taken as normally positive with respect to circuit common.

As the diodes successively conduct, an increasingly greater fraction of the voltage at slider 16 is applied to the terminal C in the network formed by resistors 29, 39, 49 and 59, coupling the pressure transmitter to the modulator. Resistors 20, 30, 40 and 50 connect to the negative side of the rectifier, and resistors 18, 28, 38 and 48 are connected to the positive side via resistor 17. The cathode of diode 25 directly, and the anodes of diodes 36, 46 and 56 via resistors 33, 43 and 53, connect to terminal C. With this arrangement, the resistors establish the values of demodulator output at which diodes 36 et al. become forward-biased and conduct, and the gain of the system between consecutive diode conductions. As is well known, appropriate adjustment of the resistor values makes the relation between modulator input and demodulator output more or less closely approximate the square root relation. In actual practice, providing three more diode-resistor sections, i.e., seven in all, allows the shape to be approximated with error of the order of 0.5% or less.

From FIG. 2, it will be observed that diodes 36, 46 and 56 relate the voltage at B, $V_B$, to the voltage at D, $V_D$ according to the corresponding straight line segments 36', 46' and 56'. Diode 26, however, creates the segment 26', which is substantially zero in the neighborhood of zero $V_D$, until it rises quite abruptly after $V_D$ leaves such neighborhood. By substantially zero it is meant that $V_B$ will be more or less constant, and considerably smaller in magnitude than the square root of the magnitude of $V_D$. Typically, this regime will be caused to obtain for $V_D$ from zero magnitude thereof, to a magnitude which is about 2% of its total range. Consequently, the transmitter may have a zero shift, without such shift producing intolerable inaccuracy in the second signal for small flow rates. In other words, every magnitude of $V_D$ may be in error by the amount of the zero shift, and it is only necessary that this error be tolerable for square root extraction from about 2 to 100% of flow range, and that the error due to making $V_B$ substantially zero, while flow is in zero to 2% of its range, is also tolerable.

In the prior art, it has been the practice to attempt to produce the square root approximation indicated by the dashed straight line segment 26". As can be readily seen from FIG. 2, the ratio of $V_B$ to $V_D$ is very large here, which means that an otherwise tolerable zero shift in the pressure transmitter output can provide a fictitious flow signal to the integrator connected to resistor 8, which signal will be integrated as if there were an appreciable flow when, in fact, there was none. The possible magnitude of the resulting error can be appreciated from the fact that it is commonly preferable that such flow as occurs at 2% (in some cases up to 10%) of the possible rate goes unintegrated, rather than that spurious signals get integrated.

The resistors 18, 19 and 20, and the position of slider 25 are so chosen that from zero $V_D$ up to about 2% of the value thereof corresponding to maximum flow in line L, the voltage across the diode 26 forward biases it. Thus, as $V_B$ goes more and more positive, the forward bias decreases, and at about where segment 26' begins, diode 26 becomes reversed biased, i.e., non-conducting. At about this point, diode 36 becomes forward biased, and if $V_B$ goes positive enough, eventually diodes 46 and 56 successively become forward biased also. For stability, the forward bias of diode 26 should be such that $V_B$ is about twice $V_D$ in the region controlled by diode 26. Otherwise, since the overall feedback resistance is relatively high, the actual function approximated is preferably $V_B = 10(V_D)^{1/2}$, or the like, so as to provide sufficiently large $V_B$ for proper operation of the function generator's diodes. By way of example, and contemplating expansion of the function generator from the four diode-resistance sections shown, to seven, the following circuit values have been found suitable:

Capacitors 27 et al., each 100 μμf; diodes 26 et al., each.
Resistors 18 et al. (in ohms, beginning with resistor 18, and preceding in order of diode conduction: 50K, 50K, 25.5K, 19.5K, 17K, 14.75K, 4.1K.
Resistor 19 is a 500 ohm potentiometer.
Resistors 20 et al.: 29.49K, 10.92K, 12.16K, 16.14K, 22.4K, 30.2K, 16.5K.
Resistors 37 et al., 3.2842M, 3.6114M, 4.0176M, 4.5436M, 5.1762M, 1.6067M. Resistor 33 may be temperature-sensitive for compensating the temperature coefficient of the diodes.
Capacitors 27, 37, 47 and 57 are bypasses preventing the diodes from operating in response to ripple in the demodulator output.

As the variation of the relation of differential pressure to flow is as from about two to one to ten to one (at full range), it is necessary to exact a relatively large signal from the system, especially if an integrator motor is to be operated. This is preferably achieved by the voltage doubling of the demodulator, since this allows the input winding 55 to $T_2$ to have a winding ratio of one to one, with respect to its output winding 15, and the amplifier designed as for a linear system, that is, with much less current furnishing capability than if the desired output voltage were attempted to be obtained by a step-up transformer $T_2$. It will be observed that the output signal range of the demodulator, whether in terms of current or volts, can be varied to accommodate the usual ranges of differential pressure signal (e.g., 0–16 ma., 4–20 ma., 1–5 ma.), by proper setting of slider 16. Thus, the demodulator output voltage may vary over a ten volt range, e.g., 0–10 volts, 1.25 to 11.25 volts, etc., depending on the transmitter, slider 16 being set to provide a nominal zero volts at zero differential pressure, whatever demodulator output voltage may be at zero differential pressure. In addition, if the transmitter is such that demodulator output is not zero at zero differential pressure, use of an integrator would ordinarily require zero demodulator output voltage at zero differential pressure. This may be accomplished by inserting a bias source 69 in one of the modulator input leads to cancel out enough of the voltage across the resistor 59 to zero the demodulator output. These expedients are, of course, to be distinguished from the role of diode 26. Thus, it may be supposed that the differential pressure transmitter nominally provides 4–20 ma. through resistor 59 (the modulator draws substantially zero current from the transmitter), corresponding to 0–100% of flow through pipe L. Adjustment of slider 16 and source 69 will provide nominal zeroing, but in an actual case, the actual output of the transmitter at zero is or can be 4.1 ma. or the like, rather than precisely 4 ma., and in any event, a zero shift equivalent to 0.1 ma. or the like will or is likely to show up at slider 16. It is this zero shift that diode 26 takes care of, since the regime corresponding to segment 26', FIG. 2, obtains for voltages at slider 16 corresponding to up to about 0.3 ma. through resistance 59.

Resistor 8 may be on the order of 1200 ohms, the illustrated slider thereon being set to pick-off the proper fraction of the voltage drop for the integrator motor which, typically is designed to operate over a range of zero to 12 volts. Resistor 10 may typically be some 300 ohms with its illustrated slider being set to pick-off the appropriate range of voltage, typically, from zero to 1 volt or so. Resistor 9 would be typically some 200 ohms.

A suitable oscillator frequency would be 100 kilocycles per second, in which case one microfarad condensers or larger for condensers 6 and 7 would provide sufficient storage capacity to support the load current demanded by the load circuitry across the capacitors. With a peak to peak voltage of 25 volts across winding 15, the demodulator will recover 90% or more of this in the voltage between terminals A and B. The demodulator transistors are preferably 2N3567's, and its diodes 1N914's. Resistors 21 through 24 are each 220 ohms. Winding 15 may be 100 turns, and windings 1 through 4, 8 turns each, in which case windings 11, 12, 13 and 14 may each be 5 turns. The primary winding 65 of transformer $T_1$ may be 30 turns, the oscillator providing 27 volts peak to peak across winding 65.

By the time that the modulated part of the oscillator output voltage shows up across winding 15, it is necessary that it have a wave shape such that its amplitude both leave and approach zero more steeply than the voltages on the windings 1 through 4. If the oscillator voltage is a sine wave, as would commonly be the case, for this purpose, the modulator can then be of the type providing a square wave output. It is also possible to design the amplifier to convert a sinusoidal input to it to a square wave output.

In any event, for delay in conduction of a given transistor in the demodulator to be effective, it is necessary that the contribution of transformer $T_2$ to the base bias of its conducting companion be greater than contribution thereto, of transformer $T_1$ during the time of the delay. The relative amplitudes of these voltages for the delay period, of course, is a function of the input to the system, and of turns ratios in the transformers. Where the modulated voltage is a square wave and the reference voltage is a sine wave, the latter may have a peak amplitude larger than the former since whenever the square wave crosses zero, the sine wave would have to have a peak of many times the amplitude of the square wave before the rate of rise (or fall) of the sine wave would so closely approximate that of the square wave, as to prevent the required delay in biasing a given transistor into conduction.

FIG. 3 illustrates the desired amplitude relation as to windings 1 and 11, when phase relation is such that the dotted ends of these windings are going positive at the same time. The delay on transistor $Q_2$ base bias is substantially the interval on the time axis from when the sine wave 1' across winding 1 crosses zero on the volt axis to when it crosses the top of the square wave 11' across winding 11. It is to be noted that $Q_2$ stops conducting before $Q_1$ does, i.e., at the time sine wave 1' crosses the top of square wave 11' in the former's swing to the negative region below the time axis.

In summary, it may be stated that the basic biasing desiderata are that, in any given half-cycle, two transistors are to be biased on, a third transistor is to be biased on for as much of the half-cycle as possible, and the fourth transistor is to turn on only after the third has turned on, and to turn off before the third turns off.

It will be observed that demodulator can provide both negative and positive output. The curve of FIG. 2 relates only to its positive output, and normally there will be no other. However, if the fluid can reverse and if the transmitter can provide a corresponding signal, or if the polarity of some set of connections (e.g., transmitter to modulator) reverses, then the demodulator can attempt to reverse its output. This results, however, in heavy feedback through diode 26 that maintains $V_B$ at nearly zero, until the normal regime of flow is restored, or the reversed connection is connected. While it may seem that the same result could be achieved simply by eliminating $Q_1$ and $Q_3$ (or $Q_2$ and $Q_4$, whichever pair happens to be providing the normal output regime), such is not the case. The elimination is perfectly feasible, and would make the demodulator sensitive to only one phasing of oscillator voltage relative to that across winding 15. However, the elimination of one polarity of demodulator output would permit leakage currents in the demodulator's non-ideal elements to provide feedback voltages, the sense of which would as likely make the feedback positive, as not, creating system instability.

The foregoing is a detailed description of my invention in accordance with the statutes. Various changes, modifications and embodiments of my invention will be obvious to those skilled in the art, and it is my intent that such fall within the scope and spirit of the claims appended hereto.

I claim:

1. In an electrical computing system including electrical means providing a first electrical signal, wherein said electrical means includes an amplifier producing at its output said first electrical signal;

and said system also including a function generator responsive to said first electrical signal to produce a second electrical signal whose amplitude is a non-linear function of said first electrical signal, said function generator being a feedback network connected between input and output of said amplifier and constructed and arranged to apply said second electrical signal to said input so as to make said first electrical signal a non-linear function of a third electrical signal also applied to the input of said amplifier, the improvement including a circuit interconnecting said input and said function generator and including a diode means; said circuit being constructed and arranged such that there is a point therein where said first electrical signal appears as a voltage; said diode means being arranged so that said voltage, when its magnitude is in a range in the neighborhood of zero, said diode means conducts said voltage, whereas when said magnitude is out of said range, said diode means substantially blocks said voltage, and said diode means being connected in parallel with said function generator and being connected to said input such that if it is conducting, it applies said voltage to said input.

2. The invention of claim 1, wherein said function generator includes a diode arranged so that said voltage is applied to it in a conducting sense, but said diode is reverse-biased to an extent preventing conduction therethrough until said voltage attains a magnitude corresponding to a desired relation between said first and second electrical signals, and outside said range.

3. In an electrical computing system including electrical means providing a first electrical signal, and a function generator responsive to said first electrical signal to produce a second electrical signal whose amplitude is a non-linear function of said first electrical signal said function generator including a bias source, a plurality of voltage dividers connected to said source such that each of said dividers produces a divider voltage equal to some fraction times the voltage of said bias source, and a plurality of diodes, one per divider and connected thereto to be biased by the divider voltage, a circuit interconnecting said means and said function generator and including a diode means; said circuit being constructed and arranged such that there is a point therein where said first electrical signal appears as a voltage; said diode means being arranged so that said voltage, when its magnitude is in a range in the neighborhood of zero, said diode means conducts said voltage, whereas when said magnitude is out of said range, said diode means substantially blocks said voltage; the improvement wherein one of said diodes is said diode means and is forward-biased by the corresponding said divider voltage, whereas each of the remainder of said diodes is reversed biased by the corresponding said divider voltage.

4. The invention of claim 3, wherein each of said diodes, except said one said diode, is provided with a resistance, one per diode, and interconnects one end of such resistance and the corresponding said divider, the other ends of all such resistance being connected together, the divider voltages and each said resistance being chosen so that a voltage applied to one side of said bias source is a square function of the voltage at said other ends of all such resistance.

5. The invention of claim 3, wherein said function generator is in the feedback circuit of a feedback amplifier, the amplifier being constructed and arranged to apply its output voltage to one side of said bias source in a sense such as to oppose the voltage of said bias source, and the input of said amplifier being connected to the said one said diode so that said output voltage opposes an input voltage applied to said input so as to produce said output voltage; the voltage divider of said one said diode being constructed so that above a certain magnitude said output voltage has a value great enough to reverse-bias said one said diode; another of said diodes having its voltage divider constructed so that after said output voltage has the last said value, said another of said diodes becomes forward-biased and applies said output voltage to said input; the remainder of said diodes being similarly arranged to successively become forward-biased; each of said remainder being provided with a resistance, one per diode, connecting it to said input for application of said output voltage thereto.

6. The invention of claim 5, wherein said voltage dividers are so constructed and each said resistance is so chosen that said diodes, except said one said diode, become forward-biased at such values of said output voltage that said output voltage is a measure of the square root of the magnitude of the input voltage.

7. In a system including first and second sources of AC voltage, said first source having the same frequency as said second source, said system being responsive to an input signal in such fashion that the AC voltage of said first source is modulated in accordance with the amplitude of said input signal and is either in phase or out-of-phase with the AC voltage of said second source, depending on the sense of said input signal, the improvement comprising a demodulator having first and second transistors, first and second diodes and a capacitor; said first diode connecting the emitter of said first transistor to the collector of said second transistor, and said second diode connecting the collector of said first transistor to the emitter of said second transistor; first means connecting voltage of said second source between base and emitter of said first transistor, second means connecting said voltage of said second source between base and emitter of said second transistor, the sense of such connections being that the sense of the first transistor base emitter bias due to said second source is the same as the sense of second transistor base-emitter bias, and the sense of connection of each said diode being such that if a said transistor is biased into conduction between emitter and collector, the said diode that is connected to the emitter of the last transistor would be biased in a forward sense by the last said conduction; said capacitor having one side connecting to the collector of one said transistor between the collector thereof and the said diode that is connected to the last said collector, and one side of said AC voltage of said first source connecting similarly to the collector of the other said transistor, and the other side of the last said AC voltage being connected to the other side of said capacitor.

8. The invention of claim 7, including delay means connected to each said transistor so as to delay bias on the base thereof from reaching a value such as would cause conduction between emitter and collector thereof.

9. The invention of claim 7, wherein said first source is a transformer having two windings across which portions of its said AC voltage appear, and wherein said second source is a transformer including a pair of windings across which portions of its said AC voltage appears; there being delayed bias means realized by a series connection of one of the first said pair of windings to one of the second said pair of windings, thereby to provide a first bias source, said first bias source being connected between base and emitter of said first transistor; the other windings of said pairs being in series connection, thereby to provide a second bias source, said second bias source being connected between emitter and base of said second transistor; the senses of said windings being such that when said sources are in phase, the one said bias source provides a bias equal to the voltage across one of its windings diminished by the voltage of the other of its said windings, whereas, in the other said bias source the voltage of one of its said windings is increased by the voltage of the other thereof; and vice versa for both said bias sources when said first and second sources are out-of-phase.

10. The system of claim 7, wherein said demodulator includes third and fourth transistors, third and fourth diodes, a second capacitor, and means interconnecting same with said sources and one another, like said first and second transistors, said first and second diodes, the first said capacitor, and said sources are interconnected with said sources and one another, except that the sense of the base-emitter biases of said third and fourth transistors is always opposite to the sense of the base-emitter biases for said first and second transistor.

11. In a system including first and second sources of AC voltage, said first source having the same frequency as said second source, said systems being responsive to an input signal in such fashion that the AC voltage of said first source is modulated in accordance with the amplitude of said input signal and is either in phase or out-of-phase with the AC voltage of said second source, depending on the sense of said input signal, the improvement comprising a demodulator having first and second transistors, first and second diodes and first and second capacitors; said first diode connecting the emitter of said first transistor to the collector of said second transistor, and said second diode connecting the emitter of said second transistor to one side of said second capacitor, the other side of said second capacitor connecting to one side of said first capacitor, the other side of said first capacitor connecting to the collector of said first transistor; first means connecting voltage of said second source between base and emitter of said first transistor, second means connecting said voltage of said second source between base and emitter of said second transistor, the sense of such connections being that the sense of the first transistor base-emitter bias due to said second source is opposite to the sense of second transistor base-emitter bias, and the sense of connection of each said diode being such that if a said transistor is biased into conduction between emitter and collector, the said diode that is connected to the emiter of the last transistor would be biased in a forward-sense by the last said conduction; one side of said AC voltage of said first source connecting to the collector of one said transistor between the collector thereof and the said diode that is connected to the last said collector, and the other side of said AC voltage of said first source connecting to said one side of said first capacitor and to said other side of said second capacitor.

References Cited

UNITED STATES PATENTS

| 3,016,197 | 1/1962 | Newbold | 235—193.5 X |
| 3,215,824 | 11/1965 | Alexander et al. | 235—193.5 X |
| 3,257,657 | 6/1966 | French | 235—197 X |
| 3,317,648 | 5/1967 | Pollack | 235—193.5 X |
| 3,413,455 | 11/1968 | Wieder et al. | 235—193.5 |

MALCOLM A. MORRISON, Primary Examiner

J. F. RUGGIERO, Assistant Examiner

U.S. Cl. X.R.

235—197